United States Patent
Davies et al.

(10) Patent No.: US 6,839,767 B1
(45) Date of Patent: Jan. 4, 2005

(54) ADMISSION CONTROL FOR AGGREGATE DATA FLOWS BASED ON A THRESHOLD ADJUSTED ACCORDING TO THE FREQUENCY OF TRAFFIC CONGESTION NOTIFICATION

(75) Inventors: Elwyn Brian Davies, Ely (GB); Alan S. Chapman, Kanata (CA)

(73) Assignee: Nortel Networks Limited, Montreal (CA)

( * ) Notice: Subject to any disclaimer, the term of this patent is extended or adjusted under 35 U.S.C. 154(b) by 821 days.

(21) Appl. No.: 09/702,760

(22) Filed: Nov. 1, 2000

Related U.S. Application Data

(63) Continuation-in-part of application No. 09/517,562, filed on Mar. 2, 2000, now abandoned.

(51) Int. Cl.$^7$ .............................................. G06F 15/16
(52) U.S. Cl. ...................... 709/232; 709/224; 370/230; 370/235; 370/352
(58) Field of Search ................................ 709/224, 232; 370/230–232, 235, 352

(56) References Cited

U.S. PATENT DOCUMENTS

| | | | | |
|---|---|---|---|---|
| 5,530,695 A | * | 6/1996 | Dighe et al. ................ | 370/232 |
| 5,719,854 A | * | 2/1998 | Choudhury et al. ........ | 370/231 |
| 5,878,224 A | * | 3/1999 | Smith ......................... | 709/224 |
| 5,970,064 A | * | 10/1999 | Clark et al. ................ | 370/351 |
| 6,119,235 A | * | 9/2000 | Vaid et al. .................. | 713/201 |
| 6,141,323 A | * | 10/2000 | Rusu et al. ................. | 370/236 |
| 6,459,682 B1 | * | 10/2002 | Ellesson et al. ............ | 370/235 |
| 6,529,499 B1 | * | 3/2003 | Doshi et al. ................ | 370/352 |
| 2002/0097747 A1 | * | 7/2002 | Kirkby et al. .............. | 370/468 |
| 2004/0022191 A1 | * | 2/2004 | Bernet et al. ............... | 370/230 |

OTHER PUBLICATIONS

Chapman, A., et al, "Traffic Management for Aggregate IP Streams", Proceedings of Canadian Conference on Broadband Research, Nov. 1999, pp. 1–9.

Albuquerque, C., et al, "Network Border Patrol", IEEE Infocom 2000, Tel Aviv, Israel, Mar. 2000; also published as UCI–ICS Technical Report 99–44, University of California, Irvine, CA, Oct. 1999.

U.S. Appl. No. 09/302,375 filed on Apr. 30/99 and entitled: Method and Apparatus for Bandwidth Management of Aggregate Data.

U.S. Appl. No. No. 09/014,110 filed on Jan. 27/98 and entitled: TCP Admission Control.

* cited by examiner

*Primary Examiner*—Wen-Tai Lin
(74) *Attorney, Agent, or Firm*—Christopher & Weisberg, P.A.

(57) ABSTRACT

An admission controller and its method of operation for controlling admission of data flows into an aggregate data flow are described. Admitted data flows are aggregated into an aggregate data flow for transmission by a router, for example, over a data network. The aggregate data flow typically follows a pre-established path through the network; for example a multi-protocol label switched (MPLS) path. The path has minimum and maximum bandwidth limits assigned to it. The admission controller controls admission of new data flows into the aggregate data flow by granting or denying new session requests for the new data flows. Congestion notifications received from the network and bandwidth limits of the path are considered in determining whether to grant or deny a new session request. In this way, the admission controller provides elastic sharing of network bandwidth among data flows without exacerbating network congestion and while remaining within the path's bandwidth limits. The data flows may include transaction oriented traffic.

43 Claims, 6 Drawing Sheets

ADMISSION CONTROL FOR AGGREGATE DATA FLOWS BASED ON A THRESHOLD ADJUSTED ACCORDING TO THE FREQUENCY OF TRAFFIC CONGESTION NOTIFICATION

CROSS-REFERENCE TO RELATED APPLICATION

This application is a continuation-in-part of U.S. application Ser. No. 09/517,562 filed Mar. 2, 2000 now abandoned.

FIELD OF THE INVENTION

This invention relates to methods of and apparatus for controlling admission of data flows into aggregate data flows. The invention also relates to a computer system and computer program for implementing this method and to a communications network comprising such a computer system.

BACKGROUND OF THE INVENTION

A typical data transport network operates in a connectionless mode whereby there is no negotiation between the transmitter/receiver and the network with regard to the type or quantity of traffic that is to be sent. The transmitter simply sends the traffic on the network, and relies on the network components to accurately deliver that traffic to the receiver. These network components consist typically of outing nodes (also known as routers or switches) joined by physical links. The main function of the routing nodes is to direct incoming packets to the appropriate outgoing links.

Many communication network applications have adopted the Internet Protocol (IP); a library of routines called by various network communications applications for transporting packets of data from node to node. The Transmission Control Protocol (TCP) is used for most IP network transactions and provides for both reliable transmission and rate adaptation in order to adjust to available network bandwidth. TCP allows use of available bandwidth and accommodation of different rates at different points in the internetwork or network.

Within the IP networks community there is a growing interest in managing data traffic in the form of aggregate data flows.

The term "aggregate data flow" is used to refer to a plurality of data flows (which are streams of data packets having a consistent or variable transmission rate) which are treated as a group in order to allow common treatment of the flows over a defined network path. The data flows may be from diverse sources. Such grouping may be achieved by interleaving the packets making up the flows (in no particular order, but generally in the order of the time at which they arrive at the aggregation point) into a single flow.

In Internet terminology, aggregating data traffic by encapsulating it into a single Internet protocol (IP) packet flow is often called tunnelling. The encapsulated traffic flow through the IP network is referred to as an aggregate trunk or tunnel. Another form of aggregation is Multi-protocol Label Switching (MPLS), which minimises overhead by using a very small label to encapsulate IP packets instead of a full TCP/IP header.

Aggregating data flows into one flow simplifies management of the network; routes can be identified for the aggregate flows more simply than if all individual data flows were visible. Treatments such as bandwidth allocation or forwarding priority can be assigned to the aggregate flow rather than having to manage the treatments on an individual flow basis. Performance commitments, for example, from a carrier or ISP to its customer are likely to be made at the aggregate flow level rather than for individual flow levels. Often the bandwidth that these aggregate flows may use is fixed. Alternatively, the bandwidth that a particular aggregate flow may use can be determined by host-based mechanisms that implement elastic bandwidth sharing with other aggregate flows.

Currently, TCP is the most widely used mechanism to achieve elastic bandwidth sharing between end-to-end IP flows and most core networks rely on end-system TCP to provide congestion control. However, since end-to-end TCP will strive for fair sharing between individual flows, this will not result in the type of bandwidth sharing and congestion control required at the aggregate flow level. TCP-like mechanisms for congestion control of aggregates have recently been proposed. For example, a paper entitled "Traffic Management for Aggregate IP Streams", by Alan Chapman and H. T. Kung, and published in the proceedings of the Canadian Conference on Broadband Research, November 1999, pages 1–9; describes such mechanisms. Typically, as network resources, such as the nodes and physical links connecting them, become congested, senders receive congestion notifications. Each sender controls transmission of a particular aggregate data flow. In standard TCP, congestion is notified by discarding data packets. For aggregate streams a separate control protocol is used for indicating congestion and no data packets need be discarded along the aggregate's path. Congestion indications from a node on the path can be triggered by buffer fill or link usage.

If the aggregate flow reduces its total rate of transmission, it is necessary for the originating data sources to likewise reduce their sending rates or have packets discarded at the input to the aggregate flow. Some end-user protocols (e.g. TCP) have mechanisms to adjust their data transmission rate in response to congestion notifications and to accommodate for lost data packets, while other protocols (e.g. UDP) lack such mechanisms. If a source does not reduce its sending rate it will cause excessive loss of packets at the aggregation point even for flows that are trying to adapt to a congestion condition.

A distinction between streaming and non-streaming data is made herein. Streaming data is an uninterrupted stream of data packets at a consistent transmission rate for a relatively long period of time, whereas non-streaming data (such as transactional data) has a transmission rate that can be bursty, or variable, in nature. A video or voice application would typically produce streaming data, making use of the user datagram protocol (UDP) for example, whereas a file transfer would typically produce non-streaming data, making use of TCP, for example. Both streaming and non-streaming data are referred to herein as data flows in the general sense. That is, a data flow may be either streaming data or non-streaming data.

Many data applications can be negatively impacted by high packet losses. If streaming data applications do not adapt to network congestion, they can cause high packet losses that would be spread over all data flows. It would be preferred that the loss of packets be allocated to one or more selected flows, rather than spread over all flows. Better still, it would be ideal if packets from a new streaming flow were never forwarded or a transaction was not started if they were expected to cause unacceptable losses for existing flows in the network.

To protect existing streams from problems caused by lost packets and interrupted data rates; it would be desirable to ascertain whether there is sufficient bandwidth available on an aggregate data flow's path for a new stream or transaction before admitting that new stream or transaction into the aggregate data flow. Similarly, if the bandwidth available reduces to less than that needed for all streams or transactions, it is desirable to discard selectively from chosen streams or transactions.

Some current methods of setting up paths through a network involve multiple interactions between the network nodes and edge points of the network or a central resource management entity. For example, the Resource Reservation Protocol (RSVP) defined by the Internet Engineering Task Force will query all nodes on a path as to the availability of bandwidth and reserve a particular amount of bandwidth for a period of time. Such protocols require mechanisms associated with each node to make admission decisions arid to signal the results of bandwidth requests to each node. Such an arrangement is necessary to reserve a guaranteed amount of bandwidth for a path through the network. However, the reservation is not amenable to fast change. Hence, these current solutions are more suitable for guaranteeing a fixed amount of bandwidth for a path through the network.

In order to achieve more efficient use of the network and to provide more resources to data sources, dynamic adjustment to the amount of bandwidth reserved for a path is desirable. In this case, the data source of a point to point path could take advantage of variability in other data traffic by using bandwidth that is made available from inactivity on other paths. The bandwidth reserved for the paths would no longer be fixed but could increase over and above any guaranteed minimum bandwidth (GMB) without detrimental effect on other paths.

These issues also apply to data flows in the form of transaction oriented traffic.

The term "transaction oriented traffic" is used herein to refer to a subset of the data flows discussed above and are communications between at least two parties which are associated with either a request being sent from one party to the other or a response being sent in reply to the request. Typically the whole of the request and response have to be reliably transmitted and received for the communication to succeed. Transaction oriented traffic includes but is not limited to world wide web accesses and remote procedure call invocations such as interactive database accesses. As such, transaction oriented traffic forms a major component, perhaps as much as 70% of today's data traffic.

Because transaction oriented traffic and hence transaction oriented services are widely used there is increasing demand to avoid overload in communications networks from transaction oriented traffic such as traffic from web-browsing. Guaranteed quality of service for such traffic is advantageous. However, currently, network congestion control schemes often simply discard packets, delay packets to the extent that the retransmission timeout of the protocol is triggered or close transactions that have been started but not finished. This is particularly wasteful of network resources because "work" is effectively done without producing any results. That is, packets associated with transactions that are started but not finished use network resources but do not produce an outcome that is useful for end users. Thus in order to provide quality of service for transaction oriented services and traffic, it is important that few packets are lost and that once a transaction has started, it should not be subject to closure or poor performance.

Transaction oriented traffic has many characteristics that differ from non-transaction oriented traffic such as file transfers or voice communications. For example, an item of transaction oriented traffic such as a world wide web access has a relatively short duration or persistence time as compared with a file transfer or voice communication. As well as this, the size of items of transaction oriented traffic is typically relatively small compared with file transfers and the like. Transaction oriented traffic is also inherently bursty and as such is difficult to control or predict.

Existing network congestion control schemes are often complex and require new signalling schemes to be implemented at many nodes throughout the communications network. This adds to costs because many nodes need to be adapted. As well as this, many existing network congestion control schemes such as reservation signalling schemes are simply not suited to transaction oriented traffic. For example, the overhead of reserving resources to guarantee the delivery of transaction oriented data is typically out of proportion to the size of the data delivered and the limited persistence of the connection. Each transaction or small set of transactions is likely to need a separate reservation especially in the web access service case and this increases the number of reservations required.

The characteristics of transaction oriented traffic discussed above have meant that this type of traffic often is not treated optimally by messaging protocols such as transport control protocol (TCP) which were designed before transaction oriented traffic became so widespread. Because transactional services often use protocols such as TCP this is a particular problem.

A fundamental characteristic of TCP is its ability to adapt the rate of flow of data across a network to provide near optimal use of the available network bandwidth. However, because transaction oriented traffic is short and bursty in nature, it does not allow the TCP adaptation process to operate effectively. Traffic bursts often result and cause congestion and the discarding of packets. This is discussed in more detail in the section headed "TCP" below.

Particular problems are involved for aggregate data flows when transaction oriented traffic is involved.

As described above, because transaction oriented traffic is short and bursty in nature, it does not allow the TCP adaptation process to operate effectively. Traffic bursts often result and cause congestion and the discarding of packets. This is particularly problematic for aggregate data flows, because packets are discarded not just from one flow within the aggregate, but are spread over many of the flows in the aggregate. Thus, the quality of service for many communication sessions are reduced, rather than that of just one communication session.

It is accordingly an object of the present invention to provide a method of admission control for data flows including those in the form of transaction oriented traffic, which overcomes or at least mitigates one or more of the problems noted above.

SUMMARY OF THE INVENTION

Embodiments of the present invention probe at the session level for bandwidth available to the aggregate flow. In effect, this allows the minimum guaranteed bandwidth of the path to be exceeded in absence of any indication that this excess bandwidth is causing detrimental effects to other traffic.

Embodiments of the present invention consider congestion notifications received at the sender in determining whether or not to admit a new data flow into an aggregate data flow being transmitted from the sender. By considering congestion notifications before admitting the new data flow, exacerbating an existing congestion condition is avoided. This avoidance helps to protect existing data streams from lost packets and rate interruptions in their data. Admission of the new data flow is accomplished by granting at the sender a new session for the new data flow. The sender does nto need to request permission from a network controller or other such resource to allow admission of the new data flow into the aggregate data flow. In this way, embodiments of the invention can be implemented at the sender, resulting in an easy and efficient implementation from a network perspective.

According to an aspect of the present invention there is provided a method of controlling admission of a data flow into an aggregate data flow to be transmitted over a network, the method comprising the steps of receiving a new session request for the data flow, determining whether to grant the new session request in dependence upon congestion notifications received from the network; and admitting the data flow into the aggregate data flow in response to the new session request being granted.

According to another aspect of the present invention there is provided a method of controlling admission of a data flaw from a source into an aggregate data flow, the aggregate data flow to be transmitted from a sender in communication with an admission controller to a receiver along a pre-established path through a network, the method comprising the steps of receiving, at the sender, data packets of the data flow from the source; determining, by the sender, whether the received data packets are from a new data flow; requesting, by the sender responsive to the received data packets being from a new data flow, a new session for the new data flow; determining, by the admission controller, whether to grant the new session request in dependence upon congestion notifications received by the sender from the network; and admitting, by the sender, the new data flow into the aggregate data flow in response to the new session request being granted by the admission controller.

According to yet another aspect of the present invention there is provided an admission controller for controlling admission of data flows into aggregate data flows, the admission controller comprising means for receiving a new session request for the data flow, means for determining whether to grant the new session request in dependence upon congestion notifications received from the network; and means for admitting the data flow into the aggregate data flow in response to the new session request being granted.

According to still another aspect of the present invention there is provided a network for communicating aggregate data flows, the network comprising the admission controller for controlling admission of data flows into aggregate data flows to be sent over the network, the admission controller comprising means for receiving a new session request for the data flow, means for determining whether to grant the new session request in dependence upon congestion notifications received from the network, and means for admitting the data flow into the aggregate data flow in response to the new session request being granted.

In a further aspect the invention provides a method of controlling admission of a transaction-oriented traffic data flow into an aggregate data flow to be transmitted over a network, the method comprising the steps of receiving a new session request for the transaction-oriented traffic data flow; determining whether to grant the new session request in dependence upon congestion notifications received from the network; and admitting the transaction-oriented data flow into the aggregate data flow in response to the new session request being granted.

In a further aspect the invention provides an admission controller for controlling admission of transaction-oriented traffic data flows into aggregate data flows, the admission controller comprising means for receiving a new session request for the transaction-oriented traffic data flow; means for determining whether to grant the new session request in dependence upon congestion notifications received from the network; and means for admitting the transaction-oriented traffic data flow into the aggregate data flow in response to the new session request being granted.

The invention provides many advantages. For example, traffic bursts that result from transaction oriented traffic are prevented from causing congestion. This is because, only as many transactions as the network can support are admitted whilst always maximising the number of transactions admitted within the available bandwidth. As well as this, transactions that have started are allowed to finish even in the event of congestion. This is because, during congestion, new transactions are not admitted. This contrasts with the prior art situation, which involved discarding packets from a plurality of flows within an aggregate flow.

Other aspects of the invention include combinations and sub-combinations of the features described above other than the combinations described above.

Further benefits and advantages of the invention will become apparent from a consideration of the following detailed description given with reference to the accompanying drawings, which specify and show preferred embodiments of the invention.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

The term "connectionless communications network" is used to refer to a communications network in which it is not essential to specify a particular path for a communication before or during that communication. An internet protocol (IP) communications network is an example of a connectionless communications network. In a connectionless communications network there is no negotiation between the transmitter/receiver and the network with regard to the type or quantity of traffic that is to be sent. The transmitter simply sends the traffic on the network, and relies on the network components to accurately deliver that traffic to the receiver.

Our previous U.S. patent application Ser. No. 09/221,778 (our reference 1113 ID) which is assigned to Nortel Networks Corporation, describes a method of admission control for transaction oriented traffic. This co-pending application was filed on 28 Dec. 1998 and the contents of this application are incorporated herein by reference. Whilst U.S. Ser. No. 09/221,778 describes a fully functional method of admission control for transaction oriented traffic, the present application describes a method which extends and improves upon this.

In U.S. Ser. No. 09/221,778 the TCP protocol or any other suitable protocol is used to send packets over a communications network. In addition, the packets are labelled to indicate the initial packets of requests and responses as well as the final packets of requests and responses. Using the label information together with information about acknowledgement messages, a network management system is able to determine the number of packets "in flight" that is, the number of packets that are currently in transit as part of transactions that are not yet completed. The network management system also has access to statistical information about the transaction oriented traffic that it receives. For example, this may comprise the average size and duration of a transaction from a particular source. Such statistical information may be pre-specified or may be determined on the basis of past behaviour. Using the statistical information and the number of packets "in flight" the network management system estimates the current load on the network resources. If the estimate of the current load exceeds a specified threshold level, then new transactions are denied admission until the network load drops. Packets labelled as being at the start of transactions may also be dropped when these packets are at admission nodes and other points in early in the path for those packets. The TCP protocol retransmits these initial packets until the network load has dropped below the threshold level at which they will be allowed through.

Figure 1:
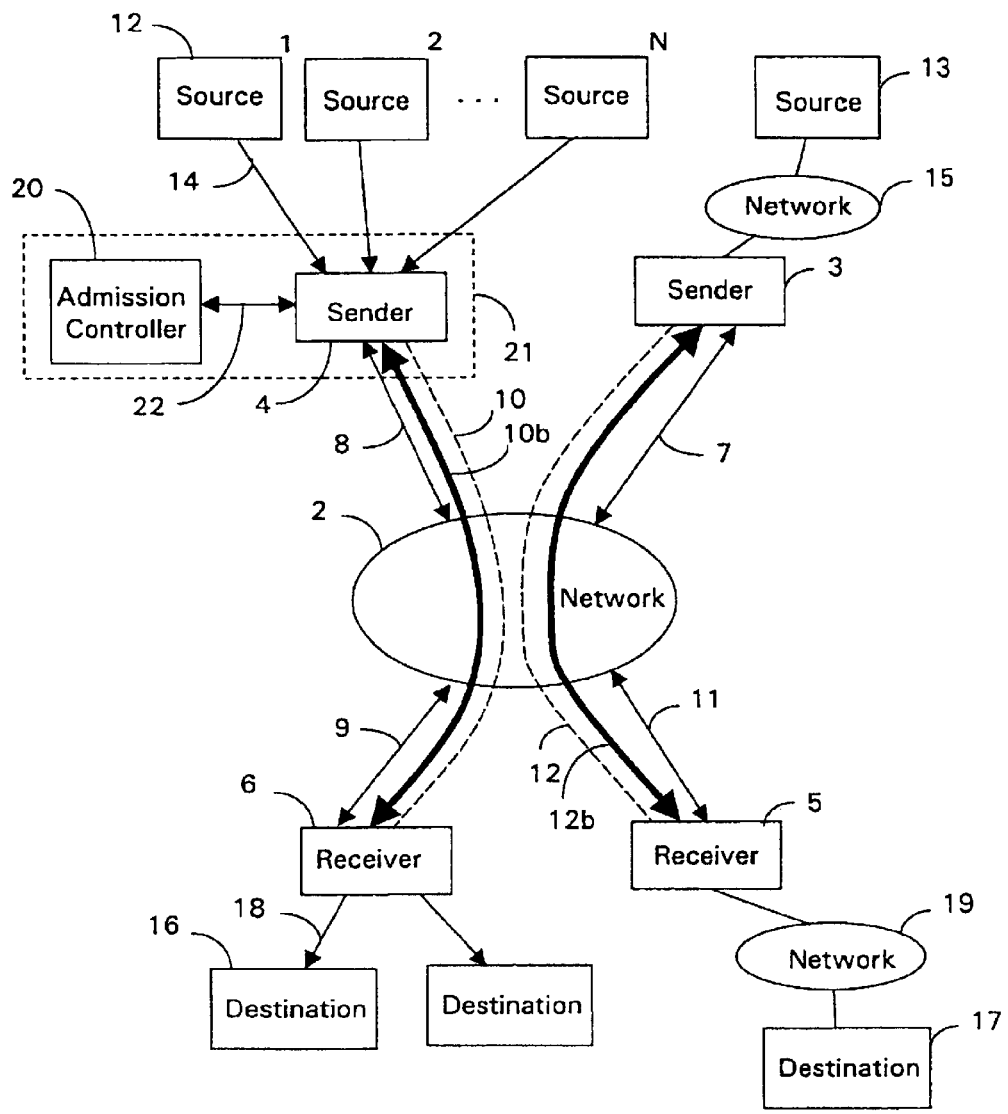
FIG. 1 illustrates a network in accordance with an embodiment of an aspect of the present invention.

Referring to FIG. 1, a network 2 provides data communication between a sender 4 and a receiver 6, both of which could be IP routers for example. The sender 4 and receiver 6 are coupled to the network 2 via physical communications links, 8 and 9, respectively. An aggregate data flow 10 (shown as a dashed line), comprising individual data flows and data streams, passes data over a path 10b through the network between the sender 4 and receiver 6. For example, the aggregate data flow 10 could make use of an MPLS path between the sender 4 and the receiver 6. The aggregate data flow 10 may include data packets from various IP transport protocols such as TCP and UDP data packets. The path 10b has a guaranteed minimum bandwidth (GMB) and a maximum bandwidth configured at the time it is set up.

The sender 4 is coupled via a communications link 14 to a source 12 of data traffic, typically the source 12 would be a host machine such as a server or a personal computer (PC) running an application which generates data traffic for transmission over the network 2. The link 14 could be part of an Ethernet local area network (LAN), a dial-up modem connection via the public switched telephone network (PSTN), or even a dedicated communications link such as a digital services 1 (DS1) or optical carrier 3 (OC3) connection, for example. Typically, a plurality of sources 12, shown as sources 1 to N in FIG. 1, could be coupled to the sender 4 as required by applications running on the sources 12.

The receiver 6 is similarly coupled via another such communications link 18 to a destination 16 for the data traffic. The destination 16, for example a PC or a server, would be running an application receptive to the data traffic from the source 12.

The network 2 can be coupled to a plurality of senders 4 and receivers 6, which can be coupled to a plurality of sources 12 and destinations 16, respectively, as shown in FIG. 1. Furthermore, the roles of the sender and receiver are interchangeable between the routers, for example, and the roles of source and destination are likewise interchangeable between the host machines as required for communication of data between applications running on the host machines.

The network 2 would typically have other paths established for communicating data between senders and receivers, another example of a which is provided below. Another sender 3 is connected to the same network 2 via a physical link 7, and another receiver 5 is likewise connected to the network 2 via a physical link 11. Another path 12b extends through the network 2 for effecting communications between the sender 3 and receiver 5. The path 12b also has its own GMB and maximum bandwidth configured. A source 13 is connected to the sender 3 via another network 15 and a destination 17 is connected to the receiver 5 via a network 19. Generally, there are many ways in which sources and destinations can be connected to each other. An aggregate data flow 12 (shown as a dashed line) passes over the path 12b and shares resources in the network 2 with other paths, for example the path 10b. It is efficient sharing of resources between paths through the network 2, while staying within respective GMBs and maximum bandwidths configured for the paths, that is desired. This sharing must take into account network congestion in order to avoid detrimental affects to traffic on the paths in question, as well as other network traffic.

A congestion condition occurs when the sources 12,13, attempt to exceed the finite bandwidth of the resources along the paths 10, 12. In response, the network will detect that resource saturation is imminent, typically by monitoring buffer or link fills in network switches, and send congestion notification messages to the senders contributing to the congestion. The senders must not add new traffic until the congestion condition has abated and may even reduce their current usage level to accelerate that abatement. If a particular sender 3, 4 reduces its sending rate then the sources 13,14 coupled to that sender should also reduce their sending rates or packets should be discarded at the sender. Protocols such as TCP have mechanisms to adapt to congestion conditions (e.g. by reducing their transmission rate in response to loss at the aggregation point), however; some protocols such as UDP do not have such mechanisms. Indeed, applications such as voice or streaming video which require relatively long periods of uninterrupted data streams of consistent transmission rate would not be tolerant to such mechanisms and use protocols such as UDP for precisely their lack of these mechanisms. Similarly, transactional flows using the TCP protocol which are just starting or have been idle for some time are able to inject a burst of traffic into the network before such congestion control can take effect on the TCP sources.

In order to avoid problems caused by lost packets and interrupted data streams; an admission controller 20 is provided at the sender 4. The admission controller 20 in response to congestion notifications received by the sender 4 controls the admission of new data flows into the aggregate data flow 10 being sent by the sender 4. If a flow is not admitted, all packets from that flow will be discarded at the sender, or in the case of flows using the TCP protocol, the flows will be temporarily stopped by the source because packets are not acknowledged back to the source. In this way existing flows experience an uninterrupted flow of packets.

The admission controller 20 is coupled to the sender 4 via a communications link 22, which could be part of a system bus in the case that the admission controller 20 and sender 4 are part of the same system 21 (shown by dotted lines in FIG. 1). For example the admission controller 20 and sender 4 could be part of a router. Moreover, the admission controller 20 could simply be a software program, which runs on the processing resources of the sender 4. Alternatively, the admission controller 20 and sender 4 could be proximally separate units in which case the link 22 could be part of an Ethernet LAN, or a serial or parallel connection directly coupling the admission controller 20 and sender 4 in a point-to-point configuration, for example. Furthermore, the admission controller 20 could be a resource shared between multiple senders 4, in which case the link 22 could be a LAN connection or even a wide area network (WAN) connection. In the event that the admission controller 20 services more than one aggregate data flow 10, the admission controller 20 would be capable of providing admission control of data flows on a per aggregate flow basis.

Figure 2:
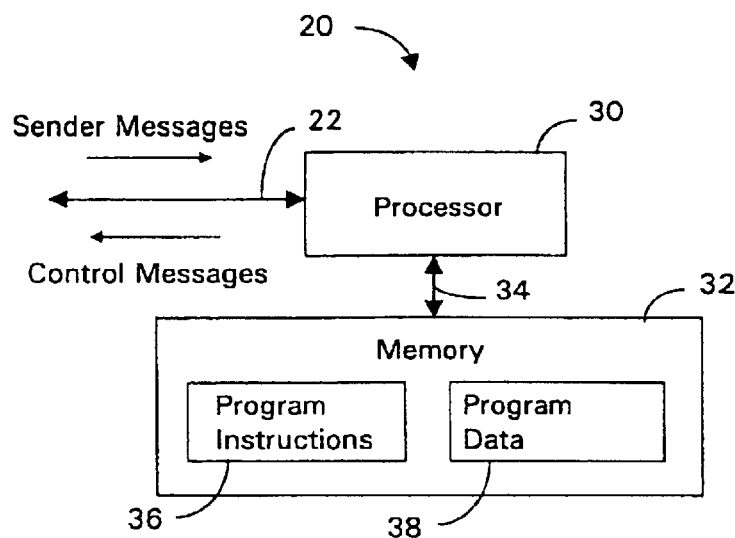
FIG. 2 illustrates the admission controller of FIG. 1 in greater detail.

Referring to FIG. 2, the admission controller 20 includes a processor 30 coupled to a memory 32 via a bus 34. The memory 32 includes storage for program instructions 36 and program data 38, both of which are required to perform the method of admission control of data flows according to an embodiment of the present invention. This method will be described later in greater detail. As shown in FIG. 2, the processor 30 receives sender messages from the sender 4 via the link 22 and also transmits control messages to the sender 4 via the same link.

Figure 3:
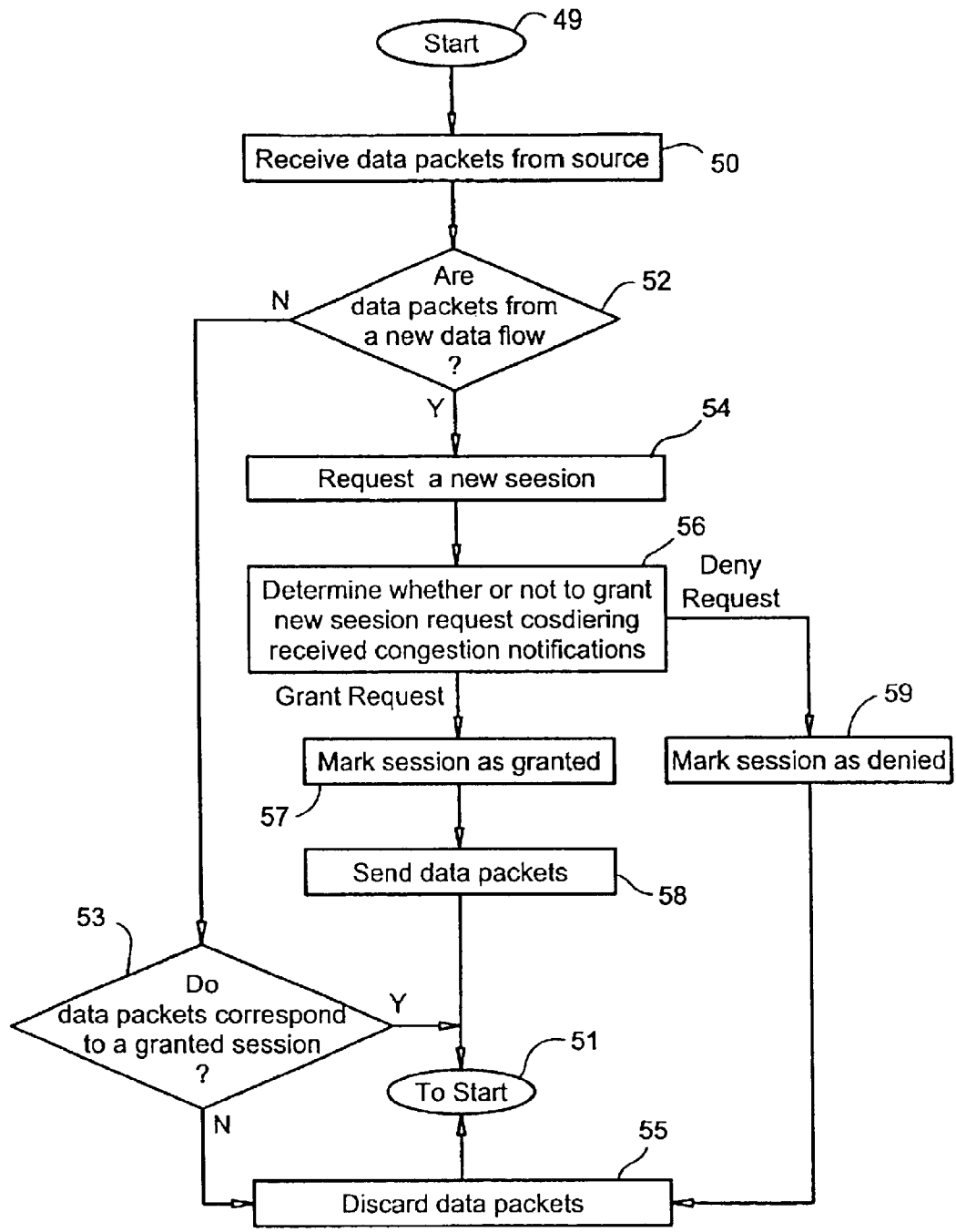
FIG. 3 is a flow chart of a method of controlling admission of data flows into aggregate data flows in accordance with an embodiment of another aspect of the present invention.

With reference to FIG. 3, an embodiment of the method of admission control of data flows into aggregate data flows will now be described. The method starts at step 49 and proceeds to step 50 in which the sender 4 receives data packets from the source 12. Then at step 52 the sender 4 determines whether or not the received data packets are from a new data flow. Typically, this would be done by the sender, which keeps a table of known data flows and their corresponding session identifiers and related information such as IP addresses of the source and destination, port numbers and the IP protocol (e.g. UDP) being used. When a data packet is received by the sender 4, the IP addresses, port numbers and protocol can be checked to determine whether a corresponding session exists or not. The granting and denying of sessions is recorded in the table. Furthermore, termination of sessions after relatively long periods of inactivity in their data traffic would also be recorded in the table. Typically, the termination would be recorded for both granted and denied sessions by deleting the entry for the session from the table.

If the received data packets are not from a new data flow (i.e. they correspond to an existing session) the method proceeds to step 53 which checks whether the existing session was granted or denied. If the existing corresponding session was denied, then the data packets are not transmitted but are instead discarded by the sender in step 55. The method then returns to the initial step 49. However, if the existing corresponding session was granted, then the method proceeds to step 58 in which the sender 4 transmits the data packets that correspond to the granted session. The next step 51 then returns to the initial step 49. If the received data packets are from a new data flow (i.e. they do not correspond to an existing session) then the sender 4 requests a new session from the admission controller 20 at step 54. This request is made by a sender message sent over the link 22. Then at step 56 the admission controller 20 receives the request and determines whether or not to grant the new session request with consideration given to congestion notifications received by the admission controller 20 from the sender 4. The sender 4 passes congestion notifications received from the network 2 to the admission controller 20 in sender messages.

If the admission controller 20 determines to grant the new session request, an indication of such is sent by the admission controller 20 to the sender 4 in a control message. The sender 4 receives the control message, enters a session identifier and related information for the session in its table at step 57, and marks the session as granted. Then in step 58, the sender 4 sends the data packets to the receiver 6 in the aggregate data flow 10. The next step 51 then returns to the initial step 49. While waiting for a response from the admission controller 20 to a request for a new session, the sender 4 may either buffer the corresponding data packets or send them in the aggregate data flow 10 in anticipation of the session request being granted. If the admission controller 20 determines to deny the new session request, an indication of this decision is likewise sent to the sender 4 in a control message. Then at step 59 the sender 4 receives this control message from the admission controller 20 and marks the session as denied in the table. The sender 4 does not transmit the corresponding data packets but discards them in step 55, or stops sending them as the case may be. The method then resumes from the initial step 49.

Figure 4:
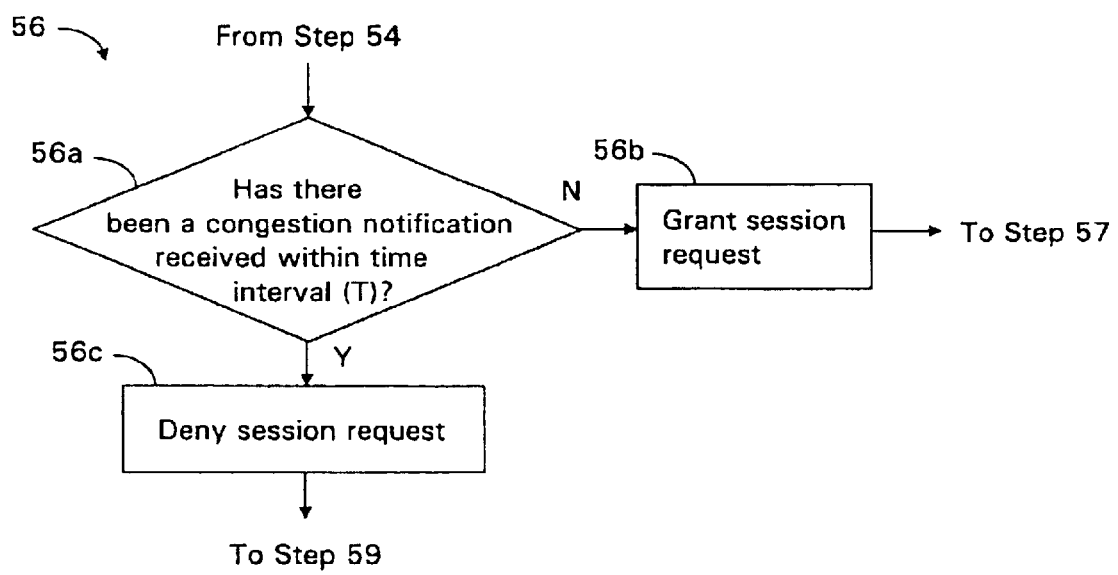
FIG. 4 is a flow chart of an embodiment of the determination step of FIG. 3.

FIG. 4 is a flow chart of an embodiment of the determination step 56 of FIG. 3. The determination step 56 starts at step 56a which determines whether there has been a congestion notification received within a predetermined time interval (T) from the present time. If there has not been a congestion notification received within this time interval (T) then the new session request is granted in step 56b. This step 56b includes formulating and sending to the sender 4 a control message indicating that the admission controller 20 has granted the new session request. The next step is the step 57 of FIG. 3. If a congestion notification has been received within the time interval (T) the new session request is denied by the admission controller 20. The denial of the new session request is performed by the admission controller 20 at step 56c by formulating and sending to the sender 4 a control message indicating denial of the request. The next step is the step 59 of FIG. 3.

This embodiment in FIG. 4 of the determination step 56 allows a period of time (T) to pass, during which the amount of data traffic should have abated, before granting any new session requests for data flows. To avoid synchronisation of several admission controllers 20 reacting to the same congestion notifications at the same time, the time interval (T) could be a random number whereby different admission controllers 20 would have a different time interval (T). The generation of the time interval (T) could be done when an admission controller 20 is initialised, or after a congestion notification has been received.

Figure 5:
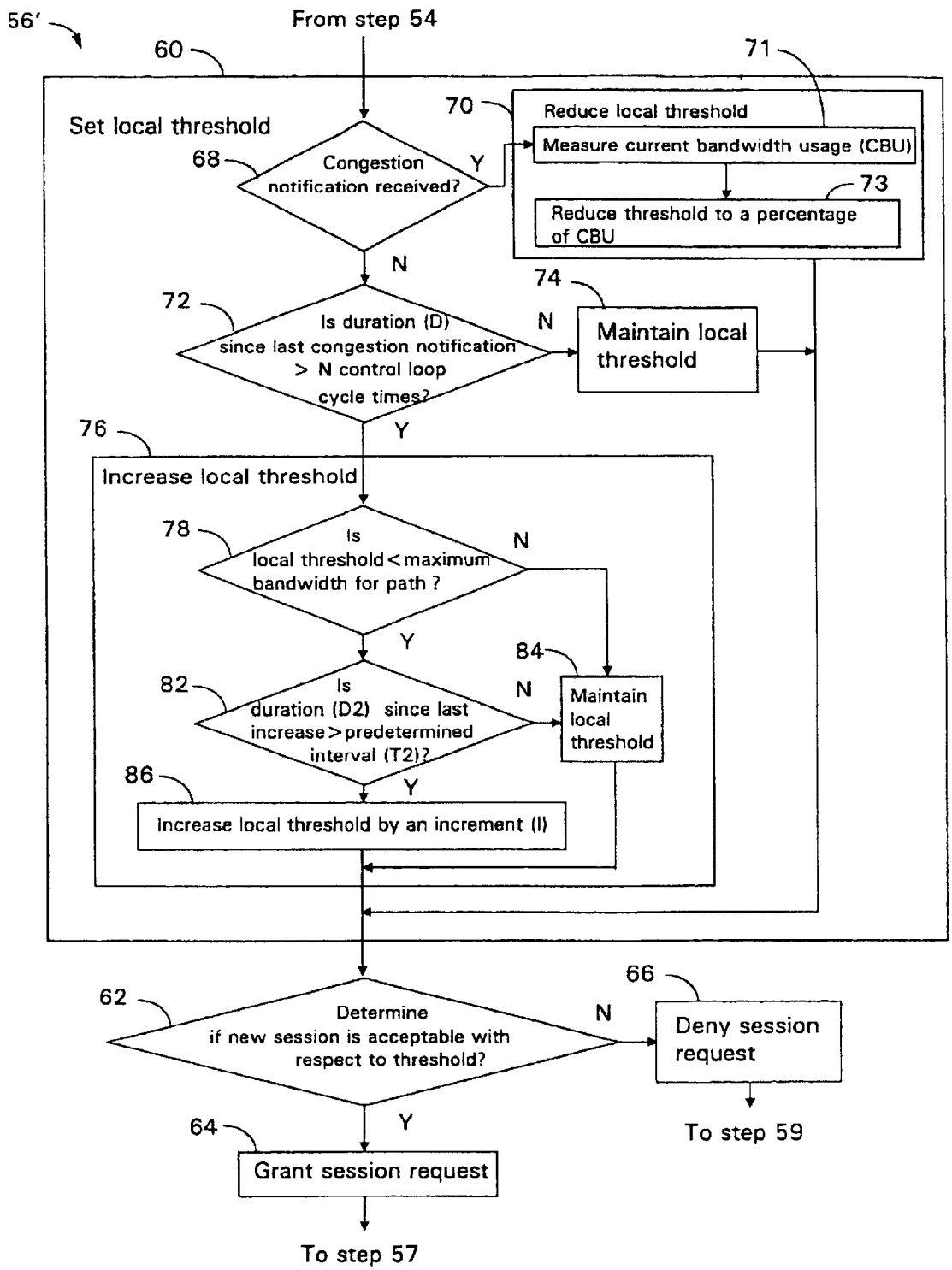
FIG. 5 is a flow chart of another embodiment of the determination step of FIG. 3.

FIG. 5 is a flow chart of another embodiment, shown generally as step 56', of the determination step 56 of FIG. 3. The determination step 56' starts at step 60, which sets a local threshold. The threshold is local to the admission controller 20 and applies only to the aggregate data flow 10. Next at step 62, the admission controller 20 determines whether the new session is acceptable with respect to the local threshold. If the new session is not acceptable, the request for the new session is denied in step 66 by formulating and sending to the sender 4 a control message indicating denial of the request. The next step is the step 59 of FIG. 3. If the new session is acceptable, the request is granted in step 64 by formulating and sending to the sender 4 a control message indicating that the request has been granted. The next step is the step 57 of FIG. 3.

The step 60 of setting the local threshold starts with step 68 which determines whether or not a congestion notification has been received since the step 60 was last executed. In the affirmative, the local threshold is reduced in step 70 by measuring the current bandwidth usage (CBU) of the aggregate data flow 10, in step 71, and reducing the threshold to a percentage (e.g. 95%) of this CBU in step 73. The local threshold would not be reduced below the guaranteed minimum bandwidth for the path 10b. This ends the step 60. The next step is the step 62 of FIG. 5. However, if a congestion notification has not been received since the step 60 was last executed, then the duration (D) since the last congestion notification is checked at step 72. The duration (D) is compared to a predetermined number (N) of control loop cycle times, and if the duration (D) is not greater, then the local threshold is maintained in step 74, otherwise the local threshold is conditionally increased in step 76. Both of steps 74 and 76 end the step 60 of setting the local threshold.

The control loop time corresponds to an estimated or configured round trip time taken for a congestion indication to be noted. This control loop time with reference to the standard TCP protocol would be one or more complete end-to-end round trip times. In schemes with backward notification, the control loop time would be the time taken for a control packet to reach the congested node and to be reflected back. In the present case, a practical approach would be to measure the control loop time, possibly taking several measurements and calculating an average, and then adding a margin to it.

The step 76 of conditionally increasing the local threshold starts with step 78 of comparing the local threshold to the maximum configured bandwidth for the path 10b. If the local threshold is greater than, or equal to, the maximum configured bandwidth, the local threshold is maintained at its current value by step 84. This ends the step 76 of increasing the local threshold. Otherwise, if the local threshold is less than the maximum configured bandwidth for the path 10b, then step 82 of comparing the duration (D2) since the last increase in the local threshold to another predetermined time interval (T2) is performed. If the duration (D2) is not greater than the interval (T2) the local threshold is maintained at its current value by step 84, which ends the step 76. However, if the duration (D2) is greater than, or equal to, the interval (T2) then the local threshold is increased by an increment (I) in step 86, which ends the step 76. The increment (I) is less than or equal to a percentage (e.g. 5%) of the current bandwidth usage. This ensures that switches in the network 2 can determine how much total traffic can increase, in a predefined time interval D2, as a percentage of the amount of current traffic. The sender 4 periodically measures this current bandwidth usage, for example, after a grant of a new session, termination of an existing session, or upon receiving a congestion notification. The sender 4 sends these measurements to the admission controller 20 in sender messages.

Figure 6:
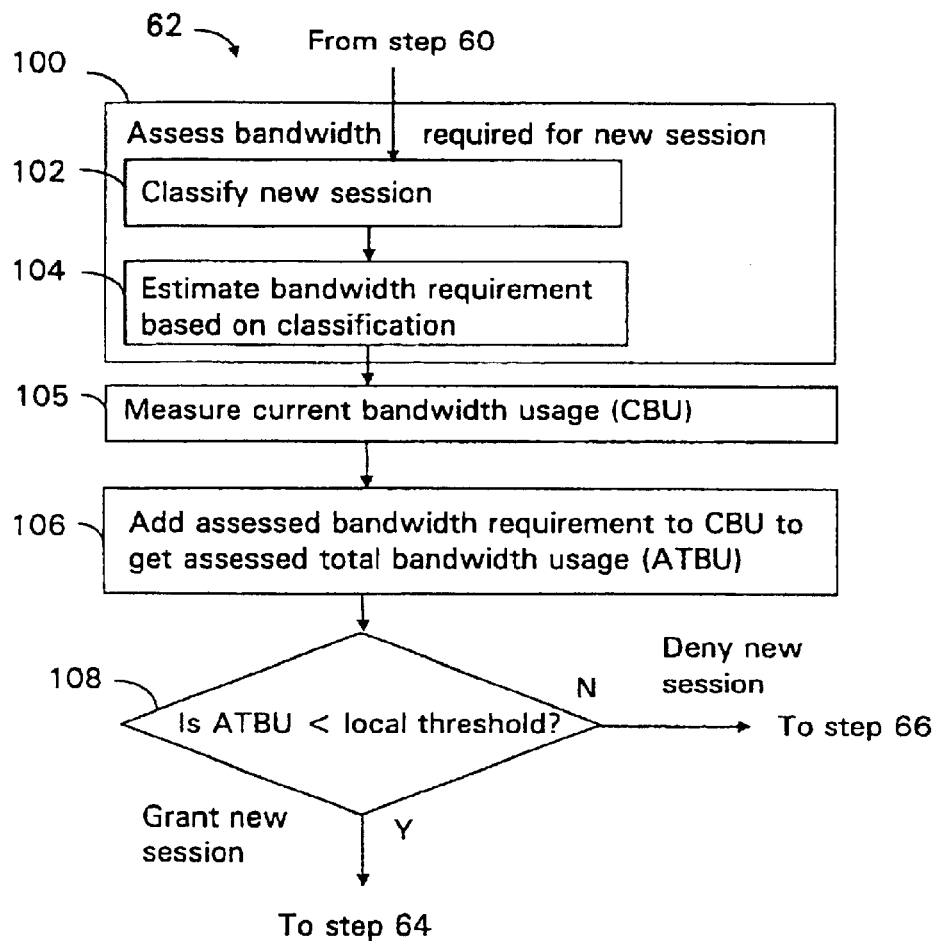
FIG. 6 is a flow chart of an embodiment of the determination step of FIG. 5.

FIG. 6 is a flow chart of an embodiment of the step 62 of determining the acceptability of the new session with respect to the local threshold. The step 62 starts with step 100 of assessing the bandwidth required for the new session. Then in step 105 the current bandwidth usage (CBU) of the path 10b or aggregate data flow 10 is measured. This step 105 is followed by step 106 of adding the assessed bandwidth requirement to the current bandwidth usage to get an assessed total bandwidth usage (ATBU). Then step 108 compares the assessed total bandwidth usage to the local threshold in order to determine whether the request for the new session should be granted or denied. If the sum is less than the local threshold, then the request for the new session should be granted, which is done by the step 64, otherwise the request should be denied, which is done by the step 66.

The step 100 of assessing the bandwidth required for the new session starts by classifying the session in step 102 and then, in step 104, an estimation of the required bandwidth is made based on the classification. In the case of transactional flows this estimate may be made on the basis of the expected amount of data in terms of bytes and packets and the expected round trip time for the connection as described later. This ends the step 100. Typically, a table having required bandwidth estimates for various session classifications would be stored in the memory 32, for example, along with other program data such as the thresholds, time intervals, margins, increments, etc., described earlier.

Figure 7:
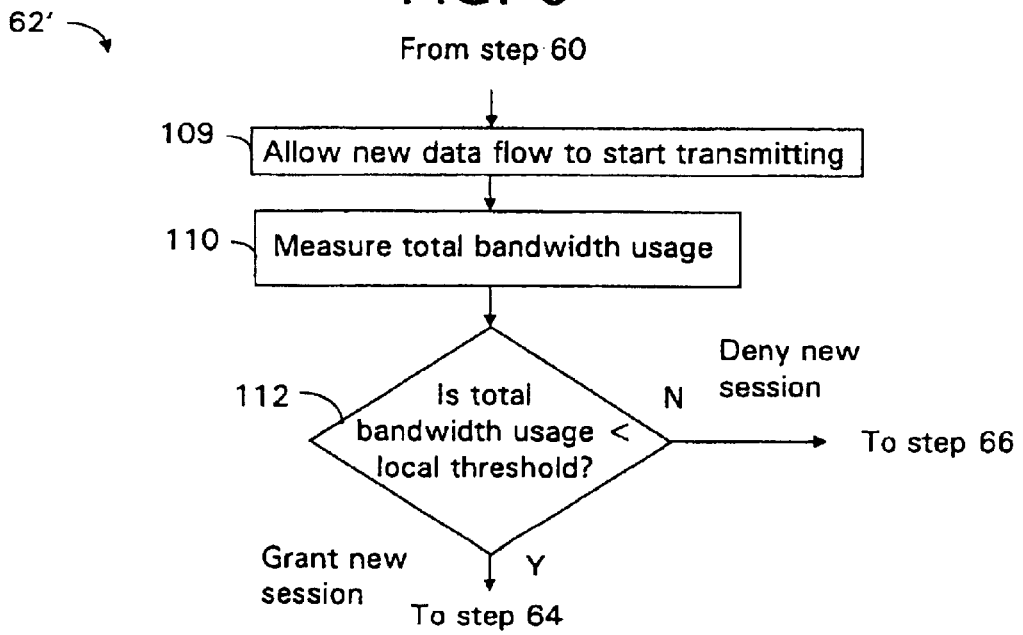
FIG. 7 is a flow chart of another embodiment of the determination step of FIG. 6.

FIG. 7 is a flow chart of another embodiment, indicated generally as 62', of the determining step 62 of FIG. 5. This embodiment is particularly useful in the case where data packet transmission is permitted while awaiting grant of the session. The step 62' starts at step 109 where transmission of data packets from the new data flow are allowed in the aggregate data flow 10. Then in step 110 the sender 4 measures the total bandwidth usage of the aggregate data flow 10 (i.e. the total bandwidth usage includes the bandwidth usage of all previously existing sessions plus the bandwidth usage of the new session requesting admission). The admission controller 20 sends a control message to the sender 4 requesting this measurement, the result of which is sent back to the admission controller 20 in a sender message. Upon receiving the measurement, the next step 112 compares this total bandwidth usage to the local threshold. If the total bandwidth usage is less than the local threshold the new session request should be granted, which is done by the step 64, otherwise the request is denied by the step 66.

The method and apparatus described above is particularly suitable for the communication of transaction-oriented traffic. Such transaction oriented traffic uses a bi-directional flow for the requests and corresponding responses. The method and apparatus described above is preferably used for the traffic in each direction, but the two directions of flow are likely to have different statistical characteristics; for example, in the case of World Wide Web connections, the responses are typically considerably larger than the requests which are often contained in just one packet whereas the response might comprise several tens or hundreds of thousands of bytes of data). To take maximum advantage of the invention, both directions should incorporate the apparatus.

In a preferred embodiment of the present invention, usage levels are estimated as described below, rather than being measured. In order to estimate usage levels, a labelling system is used as described in our previous U.S. patent application Ser. No. 09/221,778 (Nortel ref ID 1113). That is, packets are labelled to indicate the initial packets of requests and responses as well as the final packets of requests and responses. Using the label information together with information about acknowledgement messages, the admission controller is able to determine the number of packets "in flight" that is, the number of packets that are currently in transit as part of transactions that are not yet completed. The admission controller system also has access to statistical information about the transaction oriented traffic that it receives. For example, this may comprise the average size and duration of a transaction from a particular source. Such statistical information may be pre-specified or may be determined on the basis of past behaviour. Using the statistical information and the number of packets "in flight" the admission controller estimates the current load on the network resources.

In one embodiment, the initial packet of each request and response is marked or labelled as belonging to a specific class, A. Those packets which are transmitted neither first nor last within a request or response are marked with a third class, B, which is distinct from A. The final packet of each request and response is marked as belonging to class C, which is distinct from both A and B. A counter keeps a running tally of the number of class A packets that have been admitted. Processing of the corresponding end packet (of class C) causes the counter to be decremented. These labels for packet of class A, B and C are preferably implemented using differentiated service code points (DS code points).

Figure 8:
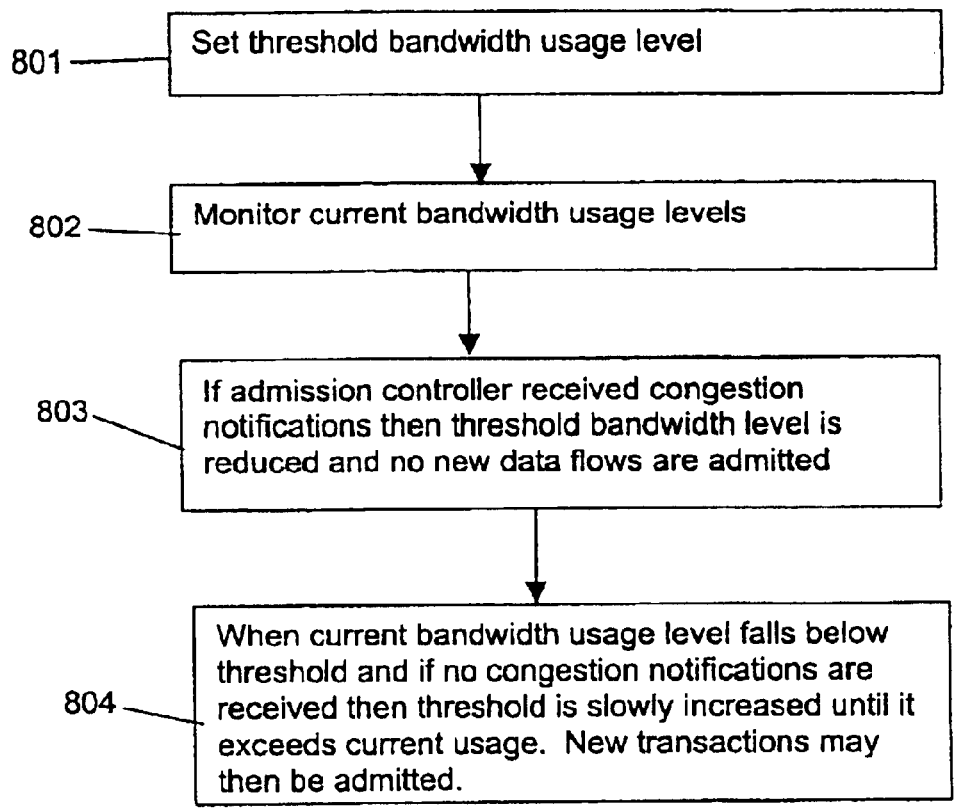
FIG. 8 is a flow chart of a method of admission control for transaction-oriented traffic.

FIG. 8 is a flow diagram of another example of a method of admission control with specific reference to transaction oriented traffic. A threshold bandwidth usage level is first set (box 801 of FIG. 8) for bandwidth usage in an aggregate data flow. Admission of new data flows (including transaction oriented data flows) to that aggregate flow is controlled by an admission controller which implements this method. Current bandwidth usage levels within the aggregate data flow are monitored (box 802 of FIG. 8), for example, either by measurement or by calculating the "number of packets in flight" using a labelling system as described above. If the admission controller receives one or more congestion notifications (box 803 of FIG. 8) then the threshold bandwidth usage level is reduced. Also, no new data flows are admitted to the aggregate flow but existing flows are allowed to remain. The current bandwidth usage level continues to be monitored until the current bandwidth usage level falls below the threshold level. At this point, and if no more congestion notifications are received (box 804 FIG. 8), then the threshold bandwidth usage level is slowly increased until it exceeds the current usage level. At that point new transactions are admitted and the process repeats.

A range of applications are within the scope of the invention. These include situations in which it is required to carry out admission control for transaction oriented traffic, for example, for admission of new transaction oriented data flows to an MPLS tunnel.

What is claimed is:

1. A method of controlling admission of a data flow into an aggregate data flow to be transmitted over a network, the method comprising the steps of:
   a) receiving a new session request for the data flow;
   b) determining whether to grant the new session request in dependence upon congestion notifications received from the network, said determination being made by steps including:
      setting a local threshold;
      adjusting the local threshold based on the frequency of traffic congestion notifications;
      determining whether the new session request is acceptable based on the adjusted local threshold; and
   c) admitting the data flow into the aggregate data flow in response to the new session request being granted.

2. The method of claim 1, wherein the step (b) of determining comprises the step of granting the new session request responsive to not receiving any congestion notifications within a predetermined time interval (T).

3. A method of controlling admission of a data flow into an aggregate data flow to be transmitted over a network, the method comprising the steps of:
   a) receiving a new session request for the data flow;
   b) determining whether to grant the new session request in dependence upon congestion notifications received from the network, the determination being made by steps comprising:
      setting a local threshold, the step of setting the local threshold comprises the steps of:
         reducing the local threshold responsive to a congestion notification being received; and
         increasing the local threshold responsive to a duration (D), since a most recently received congestion notification, being greater than a predetermined number (N) of control loop cycle times;
      determining whether the new session request is acceptable with respect to the local threshold; and
      granting, responsive to the new session request being acceptable with respect to the local threshold, the new session request; and
   c) admitting the data flow into the aggregate data flow in response to the new session request being granted.

4. The method of claim 3, wherein the step of reducing the local threshold comprises the steps of:
   measuring a current bandwidth usage of the aggregate data flow; and
   reducing the local threshold to a percentage of the measured current bandwidth usage.

5. The method of claim 3, wherein the step of increasing the local threshold comprises the steps of:
   determining whether the local threshold is less than a predetermined maximum bandwidth for the aggregate data flow;
   determining, responsive to the local threshold being less than the predetermined maximum bandwidth, whether a second duration (D2), since the local threshold was last increased, is greater than a second predetermined interval (T2); and
   increasing, responsive to the second duration (D2) being greater than the second predetermined time interval (T2), the local threshold by an increment (I).

6. The method of claim 5, wherein the increment (I) is a percentage of the current bandwidth usage.

7. The method of claim 3, wherein the local threshold is maintained at its current value responsive to the duration (D) being less than the predetermined number (N) of control loop cycle times.

8. The method of claim 5, wherein the local threshold is maintained at its current value responsive to the local threshold being greater than or equal to the maximum bandwidth for the aggregate data flow.

9. The method of claim 5, wherein the local threshold is maintained at its current value responsive to the second duration (D2) being greater than or equal to the second predetermined time interval (T2).

10. The method of claim 1, wherein the step of determining whether the new session request is acceptable further comprises the steps of:
    assessing a required bandwidth for the new session;
    measuring a current bandwidth usage of the aggregate data flow;
    adding the required bandwidth to the current bandwidth usage to get an assessed total bandwidth usage; and
    granting the new session request responsive to the assessed total bandwidth usage being less than the local threshold.

11. The method of claim 10, wherein the step of assessing the required bandwidth comprises the steps of:
    classifying the new session request; and
    estimating the required bandwidth based on the classification of the new session request.

12. A method as claimed in claim 1 wherein said step of determining whether the new session request is acceptable further comprises estimating current bandwidth usage levels of the aggregate data flow.

13. A method as claimed in claim 12 wherein the aggregate data flow includes a transaction oriented traffic data flow and said step of estimating comprises using statistical information about received transaction oriented traffic requests.

14. A method as claimed in claim 13 wherein said statistical information is pre-specified.

15. A method as claimed in claim 13 wherein said statistical information is determined on the basis of past received transaction oriented traffic requests.

16. A method as claimed in claim 1 wherein said aggregate data flow is to be transmitted over a network in a first direction, and wherein said method further comprises repeating the method for a second aggregate data flow to be transmitted over the network in the opposite direction and wherein said method comprises estimating current bandwidth usage levels of the first and second aggregate data flows.

17. A method as claimed in claim 16 wherein said step of estimating comprises using statistical information about received transaction oriented traffic requests.

18. A method as claimed in claim 17 wherein said first direction is a request direction and said opposite direction is a response direction and wherein said statistical information differs according to the direction of the aggregate traffic flow concerned.

19. A method of controlling admission of a data flow into an aggregate data flow to be transmitted over a network, the method comprising the steps of:
   a) receiving a new session request for the data flow;
   b) determining whether to grant the new session request in dependence upon congestion notifications received from the network, the determination being made by steps comprising:
      setting a local threshold;
      determining whether the new session request is acceptable with respect to the local threshold, the step of determining whether the new session request is acceptable comprises the steps of:
         allowing the data flow to start transmitting before granting the new session request;
         measuring a total bandwidth usage of the aggregate data flow that includes the data flow; and
         granting the new session request responsive to the measured total bandwidth usage being less than the local threshold;
      granting, responsive to the new session request being acceptable with respect to the local threshold, the new session request; and
   c) admitting the data flow into the aggregate data flow in response to the new session request being granted.

20. A method of controlling admission of a data flow into an aggregate data flow to be transmitted over a network, the method comprising the steps of:
   a) receiving a new session request for the data flow;
   b) determining whether to grant the new session request in dependence upon congestion notifications received from the network, the determination being made by steps comprising:
      setting a local threshold;
      determining whether the new session request is acceptable with respect to the local threshold, determining whether the new session request is acceptable comprises estimating current bandwidth usage levels of the aggregate data flow; and
      granting, responsive to the new session request being acceptable with respect to the local threshold, the new session request; and
   c) admitting the data flow into the aggregate data flow in response to the new session request being granted, wherein the aggregate data flow includes a transaction oriented traffic data flow and said step of estimating comprises obtaining information about the number of packets that are currently in transit as part of transactions that are not yet completed.

21. A method of controlling admission of a data flow from a source into an aggregate data flow, the aggregate data flow to be transmitted from a sender in communication with an admission controller to a receiver along a pre-established path through a network, the method comprising the steps of:
   a) receiving, at the sender, data packets of the data flow from the source;
   b) determining, by the sender, whether the received data packets are from a new data flow;
   c) requesting, by the sender responsive to the received data packets being from a new data flow, a new session for the new data flow;
   d) determining, by the admission controller, whether to grant the new session request in dependence upon congestion notifications received by the sender from the network, said determination being made by steps including:
      setting a local threshold;
      adjusting the local threshold based on the frequency of traffic congestion notifications;
      determining whether the new session request is acceptable based on the adjusted local threshold; and
   e) admitting, by the sender, the new data flow into the aggregate data flow in response to the new session request being granted by the admission controller.

22. The method of claim 21, wherein the step (d) of determining by the admission controller comprises the step of granting the new session request responsive to the sender not receiving any congestion notifications that pertain to the pre-established path within a predetermined time interval (T).

23. The method of claim 22, wherein the new session request is denied responsive to a congestion notification pertaining to the pre-established path being received within the predetermined time interval (T).

24. The method of claim 21, wherein the step of determining whether the new session request is acceptable further comprises the steps of:
   assessing a required bandwidth for the new session;
   measuring the current bandwidth usage of the pre-established path;
   adding the required bandwidth to the current bandwidth usage to get an assessed total bandwidth usage; and
   granting the new session request responsive to the assessed total bandwidth usage being less than the local threshold.

25. The method of claim 21, wherein the step of assessing the required bandwidth comprises the steps of:
   classifying the new session; and
   estimating the required bandwidth based on the classification of the new session.

26. The method of claim 21, wherein the new session request is denied responsive to the new session request not being acceptable with respect to the local threshold.

27. The method of claim 21, further comprising the step of sending, by the sender, the received data packets in response to the received data packets being from a data flow corresponding to a granted session request.

28. The method of claim 27, further comprising the step of discarding, by the sender, the received data packets responsive to the received data packets belonging to a data flow that corresponds to a denied session request.

29. A method as claimed in claim 21, wherein said step of determining whether the new session request is acceptable further comprises estimating current bandwidth usage levels of the aggregate data flow.

30. The method of claim 24, wherein the new session request is denied responsive to the assessed total bandwidth usage being greater than or equal to the local threshold.

31. A method of controlling admission of a data flow from a source into an aggregate data flow, the aggregate data flow to be transmitted from a sender in communication with an admission controller to a receiver along a pre-established path through a network, the method comprising the steps of:
   a) receiving, at the sender, data packets of the data flow from the source;
   b) determining, by the sender, whether the received data packets are from a new data flow;
   c) requesting, by the sender responsive to the received data packets being from a new data flow, a new session for the new data flow;
   d) determining, by the admission controller, whether to grant the new session request in dependence upon congestion notifications received by the sender from the network, determining by the admission controller comprises the steps of:
      setting a local threshold for the pre-established path, the step of setting the local threshold comprises the steps of:
         reducing the local threshold responsive to a congestion notification that pertains to the pre-established path being received by the sender; and
         increasing the local threshold responsive to a duration (D), since a most recent congestion notification received by the sender and pertaining to the pre-established path, being greater than a predetermined number (N) of control loop cycle times;
      determining whether the new session request is acceptable with respect to the local threshold; and
      granting, responsive to the new session request being acceptable with respect to the local threshold, the new session request; and
   e) admitting, by the sender, the new data flow into the aggregate data flow in response to the new session request being granted by the admission controller.

32. The method of claim 31, wherein the step of reducing the local threshold comprises the steps of:
   measuring current bandwidth usage on the pre-established path; and
   reducing the local threshold to a percentage of the measured current bandwidth usage.

33. The method of claim 31, wherein the step of increasing the local threshold comprises the steps of:
   determining whether the local threshold is less than a predetermined maximum bandwidth for the pre-established path;
   determining, responsive to the local threshold being less than the predetermined maximum bandwidth, whether a second duration (D2), since the local threshold was last increased, is greater than a second predetermined interval (T2); and
   increasing, responsive to the second duration (D2) being greater than the second predetermined time interval (T2), the local threshold by an increment (I).

34. The method of claim 33, wherein the increment (I) is a percentage of the current bandwidth usage.

35. The method of claim 31, wherein the local threshold is maintained at its current value responsive to the duration (D) being less than the predetermined number (N) of control loop cycle times.

36. The method of claim 33, wherein the local threshold is maintained at its current value responsive to the local threshold being greater than or equal to the maximum bandwidth for the pre-established path.

37. The method of claim 33, wherein the local threshold is maintained at its current value responsive to the second duration (D2) being greater than or equal to the second predetermined time interval (T2).

38. A method of controlling admission of a data flow from a source into an aggregate data flow, the aggregate data flow to be transmitted from a sender in communication with an admission controller to a receiver along a pre-established path through a network, the method comprising the steps of:
   a) receiving, at the sender, data packets of the data flow from the source;
   b) determining, by the sender, whether the received data packets are from a new data flow;
   c) requesting, by the sender responsive to the received data packets being from a new data flow, a new session for the new data flow;
   d) determining, by the admission controller, whether to grant the new session request in dependence upon congestion notifications received by the sender from the network, determining by the admission controller comprises the steps of:
      setting a local threshold for the pre-established path;
      determining whether the new session request is acceptable with respect to the local threshold, the step of determining whether the new session request is acceptable comprises the steps of:
         allowing the new data flow to start transmitting before granting the new session request;
         measuring a total bandwidth usage on the pre-established path; and
         granting the new session request responsive to the measured total bandwidth usage being less than the local threshold; and
      granting, responsive to the new session request being acceptable with respect to the local threshold, the new session request; and
   e) admitting by the sender, the new data flow into the aggregate data flow in response to the new session request being granted by the admission controller.

39. The method of claim 38, wherein the new session request is denied responsive to the measured total bandwidth usage being greater than or equal to the local threshold.

40. An admission controller for controlling admission of data flows into aggregate data flows, the admission controller comprising:
   means for receiving a new session request for the data flow;
   means for determining whether to grant the new session request in dependence upon congestion notifications received from the network, said determination means operating to:
      set a local threshold;
      adjust the local threshold based on the frequency of traffic congestion notifications;

determine whether the new session request is acceptable based on the adjusted local threshold; and means for admitting the data flow into the aggregate data flow in response to the new session request being granted.

41. A network for communicating aggregate data flows, the network comprising the admission controller of claim 40.

42. A method of controlling admission of a transaction-oriented traffic data flow into an aggregate data flow to be transmitted over a network, the method comprising the steps of:
 a) receiving a new session request for the transaction-oriented traffic data flow;
 b) determining whether to grant the new session request in dependence upon congestion notifications received from the network said determination being made by steps comprising:
  setting a local threshold;
  adjusting the local threshold based on the frequency of traffic congestion notifications;
  determining whether the new session request is acceptable based on the adjusted local threshold; and
 c) admitting the transaction-oriented data flow into the aggregate data flow in response to the new session request being granted.

43. An admission controller for controlling admission of transaction-oriented traffic data flows into aggregate data flows, the admission controller comprising:
 means for receiving a new session request for the transaction-oriented traffic data flow;
 means for determining whether to grant the new session request in dependence upon congestion notifications received from the network, said determination means operating to:
  set a local threshold:
  adjust the local threshold based on the frequency of traffic congestion notifications;
  determine whether the new session request is acceptable based on the adjusted local threshold; and
 means for admitting the transaction-oriented traffic data flow into the aggregate data flow in response to the new session request being granted.

* * * * *